US012675198B2

(12) United States Patent　　(10) Patent No.:　US 12,675,198 B2
Umemura　　　　　　　　　　　　(45) Date of Patent:　　　Jul. 7, 2026

(54) INPUT DEVICE

(71) Applicant: Alps Alpine Co., Ltd., Tokyo (JP)

(72) Inventor: Shunsuke Umemura, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 19/086,274

(22) Filed: Mar. 21, 2025

(65) Prior Publication Data

US 2025/0216992 A1　　Jul. 3, 2025

Related U.S. Application Data

(63) Continuation of application No. PCT/JP2023/038471, filed on Oct. 25, 2023.

(30) Foreign Application Priority Data

Nov. 10, 2022　(JP) ................................. 2022-180505

(51) Int. Cl.
G06F 3/044 (2006.01)

(52) U.S. Cl.
CPC .......... G06F 3/0445 (2019.05); G06F 3/0448 (2019.05)

(58) Field of Classification Search
CPC .............................. G06F 3/0445; G06F 3/0448
See application file for complete search history.

(56) References Cited

U.S. PATENT DOCUMENTS 9,525,417 B2 * 12/2016 Inada .................... H03K 17/962
10,007,343 B2 * 6/2018 Kim ....................... G06V 40/13

| | | | | |
|---|---|---|---|---|
| 10,248,264 | B2 * | 4/2019 | Caldwell | ............... G06F 3/0446 |
| 10,402,032 | B2 * | 9/2019 | Hashida | ................ G06F 3/0412 |
| 10,514,804 | B2 * | 12/2019 | Hashida | ................ G06F 3/0445 |
| 10,649,604 | B2 * | 5/2020 | Hashida | ................ G06F 3/0445 |
| 10,712,890 | B2 * | 7/2020 | Hashida | ................ G06F 3/0445 |
| 10,949,043 | B2 * | 3/2021 | Hashida | ................ B32B 27/325 |
| 2009/0256818 | A1 * | 10/2009 | Noguchi | ............... G06F 3/0445 345/174 |
| 2010/0295824 | A1 * | 11/2010 | Noguchi | ............... G06F 3/0446 345/175 |
| 2015/0301646 | A1 * | 10/2015 | Caldwell | ............... G06F 3/0418 345/174 |
| 2017/0285746 | A1 * | 10/2017 | Kim | ....................... G06F 3/0445 |
| 2017/0364259 | A1 * | 12/2017 | Kamata | ................ G06F 3/0233 |
| 2019/0220119 | A1 * | 7/2019 | Hashida | .................. G06F 3/041 |

(Continued)

FOREIGN PATENT DOCUMENTS

| | | | | |
|---|---|---|---|---|
| CN | 108700970 A | * | 10/2018 | ........... H03K 17/975 |
| CN | 110573442 A | * | 12/2019 | ............. B65G 43/08 |

(Continued)

OTHER PUBLICATIONS

Machine translation of TW-201248249-A. (Year: 2025).*
Machine translation of CN-108700970-A (Year: 2025).*
Machine translation of CN-110573442-A (Year: 2025).*

*Primary Examiner* — Michael Pervan
(74) *Attorney, Agent, or Firm* — Harness, Dickey & Pierce, P.L.C.

(57) ABSTRACT

An input device includes a detection electrode, a drive electrode facing the detection electrode, a power supply that applies an alternating current drive voltage to the drive electrode, a detector that detects an output of the detection electrode, and a capacitor disposed in series between the drive electrode and the power supply.

15 Claims, 7 Drawing Sheets

<u>100</u>

(56)      References Cited

U.S. PATENT DOCUMENTS

2019/0369774 A1 * 12/2019 Hashida ................ G06F 3/0412
2020/0081578 A1 *  3/2020 Hashida ................ B32B 27/308
2025/0271972 A1 *  8/2025 Umemura ............ G06F 3/0445

FOREIGN PATENT DOCUMENTS

JP          2013-015976 A      1/2013
JP          2017-049094 A      3/2017
JP          2018-139146 A      9/2018
TW            201248249 A  * 12/2012   ......... H03K 17/9622

* cited by examiner

INPUT DEVICE

CLAIM OF PRIORITY

This application is a Continuation of International Application No. PCT/JP2023/038471 filed on Oct. 25, 2023, which claims benefit of Japanese Patent Application No. 2022-180505 filed on Nov. 10, 2022. The entire contents of each application noted above are hereby incorporated by reference.

BACKGROUND OF THE INVENTION

1. Field of the Invention

The present disclosure relates to an input device.

2. Description of the Related Art

In general, capacitive input devices with a plate-shaped base material, a conductive and flexible surface plate facing the base material, a non-conductive spacer positioned between the base material and the surface plate, and one or more detection electrodes disposed on the base material have been used. Such a capacitive input device has a first detection state in which the surface plate is not grounded and a second state in which the surface plate is grounded. A degree of approach of an operation body to the surface plate is detected in the first detection state, whereas a press on the surface plate by the operation body is detected in the second detection state. The capacitive input device includes a controller that performs switching between the first detection state and the second detection state from one to another. The controller switches the first detection state to the second detection state when the degree of approach between the operation body and the surface plate becomes equal to or less than a first threshold value (see, for example, Japanese Unexamined Patent Application Publication No. 2017-049094).

Here, the general capacitive input devices require switching between the first and second detection states of the surface plate.

SUMMARY OF THE INVENTION

The present invention provides an input device capable of detecting an operation of an operation body with a simple configuration.

An input device according to an embodiment of the present disclosure includes a detection electrode, a drive electrode facing the detection electrode, a power supply that applies an alternating current drive voltage to the drive electrode, a detector that detects an output of the detection electrode, and a capacitor disposed in series between the drive electrode and the power supply so that the drive voltage is applicable to the drive electrode.

An input device capable of detecting an operation of an operation body with a simple configuration can be provided.

DESCRIPTION OF THE PREFERRED EMBODIMENTS

The following is a description of an embodiment of an input device of the present disclosure.

In the following, a description will be made while an XYZ coordinate system is defined. A direction parallel to an X axis (X direction), a direction parallel to a Y axis (Y direction), and a direction parallel to a Z axis (Z direction) are orthogonal to one another. For convenience of explanation, a side in an −Z direction may be referred to as a lower side or a bottom and a side in a +Z direction as an upper side or a top, but this does not represent a universal vertical relationship. Furthermore, a plan view means to view an XY plane.

Moreover, lengths, widths, thicknesses, and the like of individual components may be exaggerated in the following to make a configuration easier to understand. In addition, the wording, such as parallel, up and down, etc., shall be allowed to deviate to the extent that it does not impair the effect of the embodiment.

Embodiment

Figure 1A:
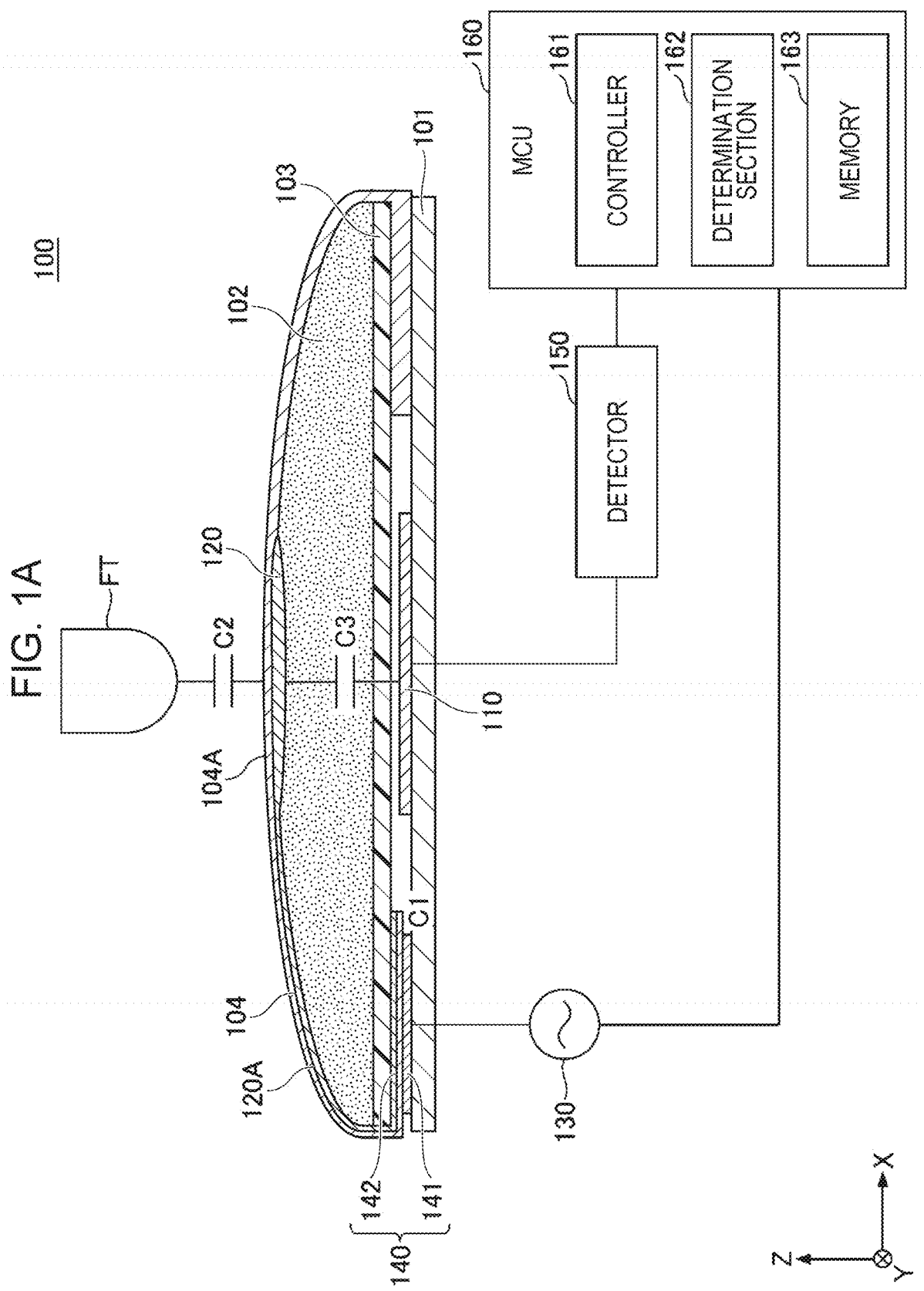
FIG. 1A is a cross-sectional view of an example of a configuration of an input device according to an embodiment.
Figure 2:
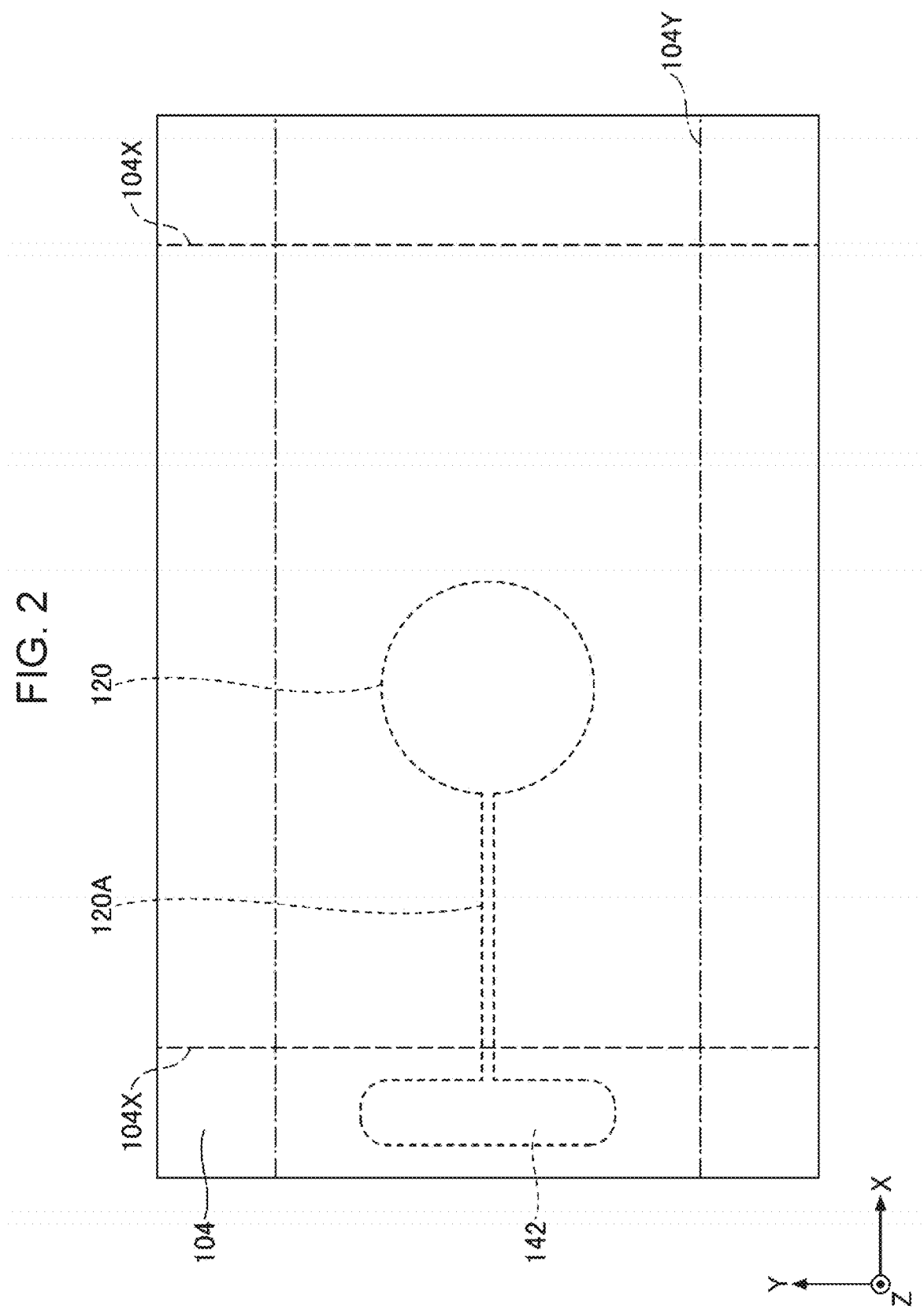
FIG. 2 is an exploded view of the input device with a skin unfolded.

FIG. 1A is a cross-sectional view of an example of a configuration of an input device 100 according to an embodiment. FIG. 2 is an exploded view of the input device 100 with a skin 104 unfolded.
Configuration of Input Device 100
The input device 100 includes a substrate 101, a foam layer 102, a support plate 103, the skin 104, a detection electrode 110, a drive electrode 120, a power supply 130, a capacitor 140, a detector 150, and a micro controller unit (MCU) 160. The foam layer 102 is an example of an elastic member that can be deformed by a pressing operation performed by an operation body. The capacitor 140 has a first electrode 141 and a second electrode 142. A top surface of the skin 104 serves as an operation surface 104A of the input device 100.

The input device 100 determines whether a fingertip FT, as an example of an operation body, has performed an operation of approaching, touching, or pressing on the operation surface 104A of the input device 100. The input device 100 determines whether an operation has been performed based on a capacitance between the detection electrode 110 and the drive electrode 120 using a mutual capacitance method. In the following, operations by approaching, touching, and pressing may be referred to as an approaching operation, a touching operation, and a pressing operation, respectively. Furthermore, the operation body is not limited to the fingertip FT.

Note that, as the pressing operation, the fingertip FT presses the operation surface 104A downward. As the touching operation, the fingertip FT touches the operation surface 104A but does no press the operation surface 104A downward. As the approaching operation, the fingertip FT does not touch the operation surface 104A, but the fingertip FT is brought so close to the operation surface 104A that a capacitance between the detection electrode 110 and the drive electrode 120 becomes somewhat small.

In the following, a capacitance of the first and second electrodes 141 and 142 of the capacitor 140 is denoted by C1, a capacitance between the fingertip FT and the drive electrode 120 is denoted by C2, and a capacitance between the detection electrode 110 and the drive electrode 120 is denoted by C3. Furthermore, for convenience of explanation, a capacitor with the capacitance C2 is referred to as a capacitor composed of the fingertip FT and the drive electrode 120, and a capacitor with the capacitance C3 is referred to as a capacitor composed of the detection electrode 110 and the drive electrode 120. The capacitor composed of the fingertip FT and the drive electrode 120 has the fingertip FT and the drive electrode 120 as two electrodes. The capacitor composed of the detection electrode 110 and the drive electrode 120 has the detection electrode 110 and the drive electrode 120 as two electrodes.

Substrate 101

The substrate 101 is disposed at a bottom of the input device 100. The substrate 101 is a wiring substrate, for example. The detection electrode 110 and the first electrode 141 are disposed on a top surface of the substrate 101.

Foam Layer 102

The foam layer 102 has a depth (width) in the Y direction and is rectangular in plan view, for example. The foam layer 102 is fixed to a top surface of the support plate 103. The foam layer 102 has such a shape that a top surface and four sides are continuously curved, for example. The foam layer 102 may be made of foam materials, such as urethane foam, foam sponge, or foam rubber, and has cushioning properties. The foam layer 102 is disposed on the support plate 103, and the entire top surface and the entire four sides are covered with the skin 104.

Support Plate 103

The support plate 103 is a rectangular plate-shaped member in plan view that supports the foam layer 102. The support plate 103 is made of synthetic resin, for example. The support plate 103 is fixed to the top surface of the substrate 101 with the foam layer 102 on its top surface and regions along four sides of a bottom surface thereof covered with the skin 104. Furthermore, the support plate 103 may be fixed to a member or the like, not illustrated, while being spaced away from the substrate 101. Alternatively, the support plate 103 may be omitted.

Skin 104

The skin 104 is a fabric-like cover made of cloth manufactured from synthetic fibers or cotton, synthetic leather, or leather, which covers an entire outer surface of the foam layer 102 and easily changes a shape to fit a shape of the outer surface of the foam layer 102. The skin 104 has the operation surface 104A. The operation surface 104A is the top surface of the skin 104 and is a decorative layer that is exposed to an interior of a vehicle. The operation surface 104A is a portion of the outer surface of the skin 104 that overlaps at least the drive electrode 120.

The drive electrode 120, an extending portion 120A, and the second electrode 142 are formed on a back surface of the skin 104 opposite the operation surface 104A (a bottom surface in a state in which the operation surface 104A serves as the top surface in an unfolded state as illustrated in FIG. 2). The skin 104, for example, covers the top surface and the sides of the foam layer 102, is folded back to the bottom surface of the support plate 103 that supports the foam layer 102 along mountain fold lines 104X and 104Y illustrated in FIG. 2, and adheres to the bottom surface of the support plate 103. In this state, the drive electrode 120, the extending portion 120A, and the second electrode 142 contact the outer surface of the foam layer 102.

Although the skin 104 is described here in the form of a cloth-like cover that covers the entire outer surface of the foam layer 102, the skin 104 may be a bag-like cover that can contain the entire foam layer 102. The skin 104 is configured to cover at least the top surface of the foam layer 102, and therefore, may cover, for example, only the top surface of the foam layer 102 or cover the top surface and the sides of the foam layer 102.

Detection Electrode 110

The detection electrode 110 is located in a center portion of the top surface of the substrate 101. The detection electrode 110 is made of copper foil, for example. The detection electrode 110 is circular, for example, in plan view and is disposed so as to face the drive electrode 120. The detection electrode 110 is connected to the detector 150 via wiring of the substrate 101 or wiring arranged outside the substrate 101.

Drive Electrode 120

The drive electrode 120 is located in a center portion of the back surface of the skin 104 opposite the operation surface 104A (the bottom surface in the state in which the operation surface 104A is the top surface in the unfolded state as illustrated in FIG. 2). The drive electrode 120 has the extending portion 120A extending in the −X direction. The extending portion 120A connects the drive electrode 120 to the second electrode 142 with each other and straddles the mountain fold line 104X on a −X direction side. The drive electrode 120 and the extending portion 120A are formed by printing a silver paste or the like on the bottom surface of the skin 104, for example.

Power Supply 130

The power supply 130 is connected to the first electrode 141 of the capacitor 140, and when driven by a controller 161 of the MCU 160, outputs an AC drive voltage to the first electrode 141. The power supply 130 may be any AC power supply capable of outputting an AC drive voltage.

Capacitor 140

The capacitor 140 has the first electrode 141 and the second electrode 142.

The first electrode 141 is disposed at an end portion in the −X direction of the top surface of the substrate 101 and faces the second electrode 142. The first electrode 141 is made of copper foil, for example. The first electrode 141 is connected to the power supply 130. When a determination section 162 of the MCU 160 determines whether an operation has been performed by the fingertip FT, an AC drive voltage is applied to the first electrode 141 from the power supply 130.

The second electrode 142 is disposed at an end portion in the −X direction of the back surface of the skin 104 opposite the operation surface 104A (the bottom surface when the operation surface 104A serves as the top surface in the unfolded state as illustrated in FIG. 2), and is positioned on a bottom surface of the foam layer 102 in the −X direction as illustrated in FIG. 1A in a state in which the skin 104 is attached to the support plate 103. The second electrode 142 is connected to the drive electrode 120 via the extending portion 120A. The second electrode 142 is formed by printing a silver paste or the like on the bottom surface of the skin 104, for example. Note that the second electrode 142, the drive electrode 120, and the extending portion 120A may be formed on the outer surface of the foam layer 102. Furthermore, although being formed on the skin 104, the second electrode 142, the drive electrode 120, and the extending portion 120A may be formed by a thin metal plate or formed on a film substrate which is different from the foam layer 102 and the skin 104 and which is sandwiched between the foam layer 102 and the skin 104.

Figure 1B:
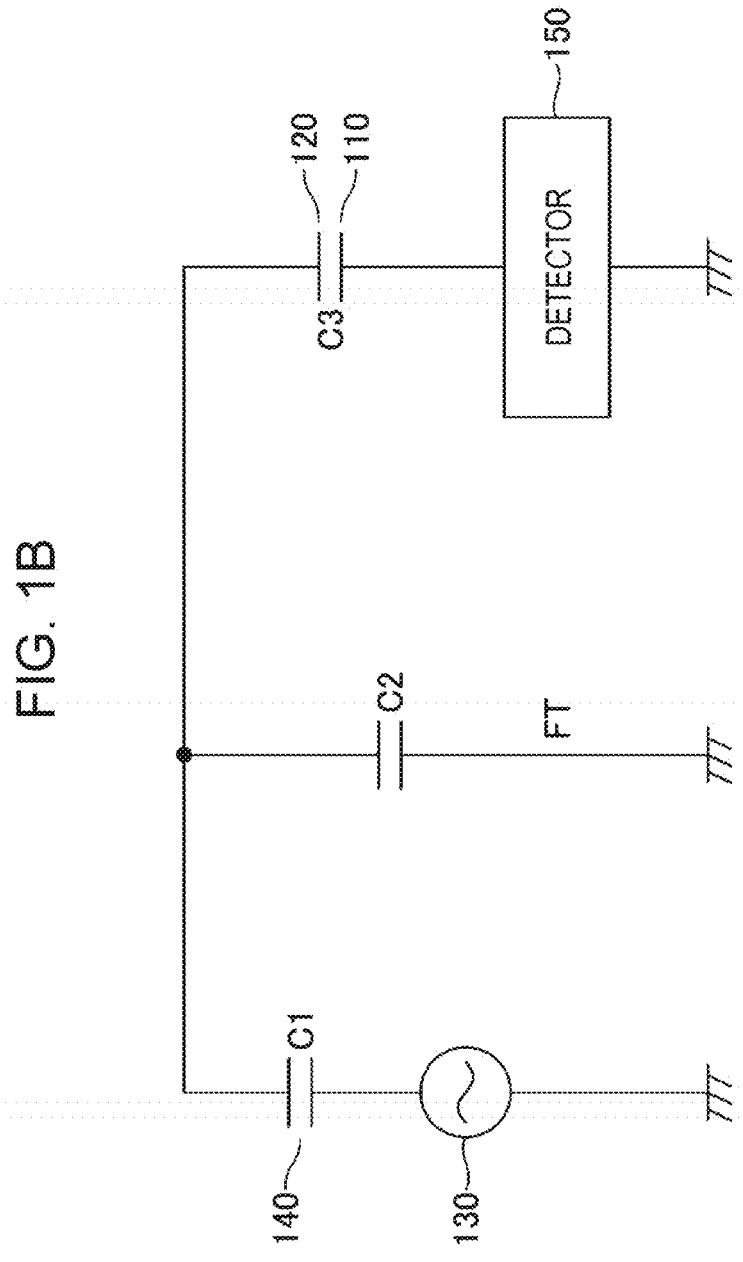
FIG. 1B is a diagram illustrating an equivalent circuit of the input device.

FIG. 1B is a diagram illustrating an equivalent circuit of the input device 100. The capacitor 140 is connected in series between the drive electrode 120 and the power supply 130. The drive electrode 120 is connected to the ground through the fingertip FT (human body). The power supply 130 is a near-ideal AC power supply with an output impedance of substantially zero, and can output a nearly constant voltage regardless of a load. Therefore, if the drive electrode 120 is directly connected to the power supply 130 without the capacitor 140, even when the capacitance C2 changes due to approach of the fingertip FT to the drive electrode 120, a current value (electric charge) supplied from the power supply 130 and detected by the detector 150 does not change and an approaching operation or a touching operation may not be detected.

However, the input device 100 of this embodiment includes the capacitor 140 connected in series between the drive electrode 120 and the power supply 130. Therefore, the behavior equivalent to that of a power supply with a given output impedance is attained, and a given current is supplied to the capacitor 140. When the fingertip FT approaches the drive electrode 120, a current supplied from the power supply 130 and flowing from the capacitor 140 is branched to the capacitor composed of the fingertip FT and the drive electrode 120, and therefore, a current value (electric charge) detected by the detector 150 is reduced as the capacitance C2 of the capacitor composed of the fingertip FT and the drive electrode 120 is increased. Accordingly, an approaching operation, a touching operation, or a pressing operation may be detected.

Detector 150

The detector 150 is connected to the detection electrode 110 and detects a current value (electric charge) flowing through the detection electrode 110. The detector 150 converts a detected current (electric charge) into a digital value and outputs the digital value. The detector 150 functions as an analog-to-digital (AD) converter. The detector 150 outputs the digitally converted current value (electric charge) to the MCU 160.

MCU 160

The MCU 160 includes the controller 161, the determination section 162, and a memory 163. The MCU 160 is implemented by a computer that includes a central processing unit (CPU), a random access memory (RAM), a read only memory (ROM), an input/output interface, and an internal bus.

The controller 161 and the determination section 162 are illustrated as functional blocks of functions of programs to be executed by the MCU 160. Furthermore, the memory 163 functionally indicates a memory of the MCU 160.

The controller 161 is a processor that oversees operation of the MCU 160, and performs, for example, driving of the power supply 130 and other processes.

The determination section 162 determines whether an operation has been performed based on an output (current value) of the detector 150. The determination section 162 can determine whether an operation being performed is an approaching operation, a touching operation, or a pressing operation, for example.

The memory 163 stores programs, data, etc. required for the controller 161 and the determination section 162 to perform processing.

Operation of Input Device 100

Figure 3:
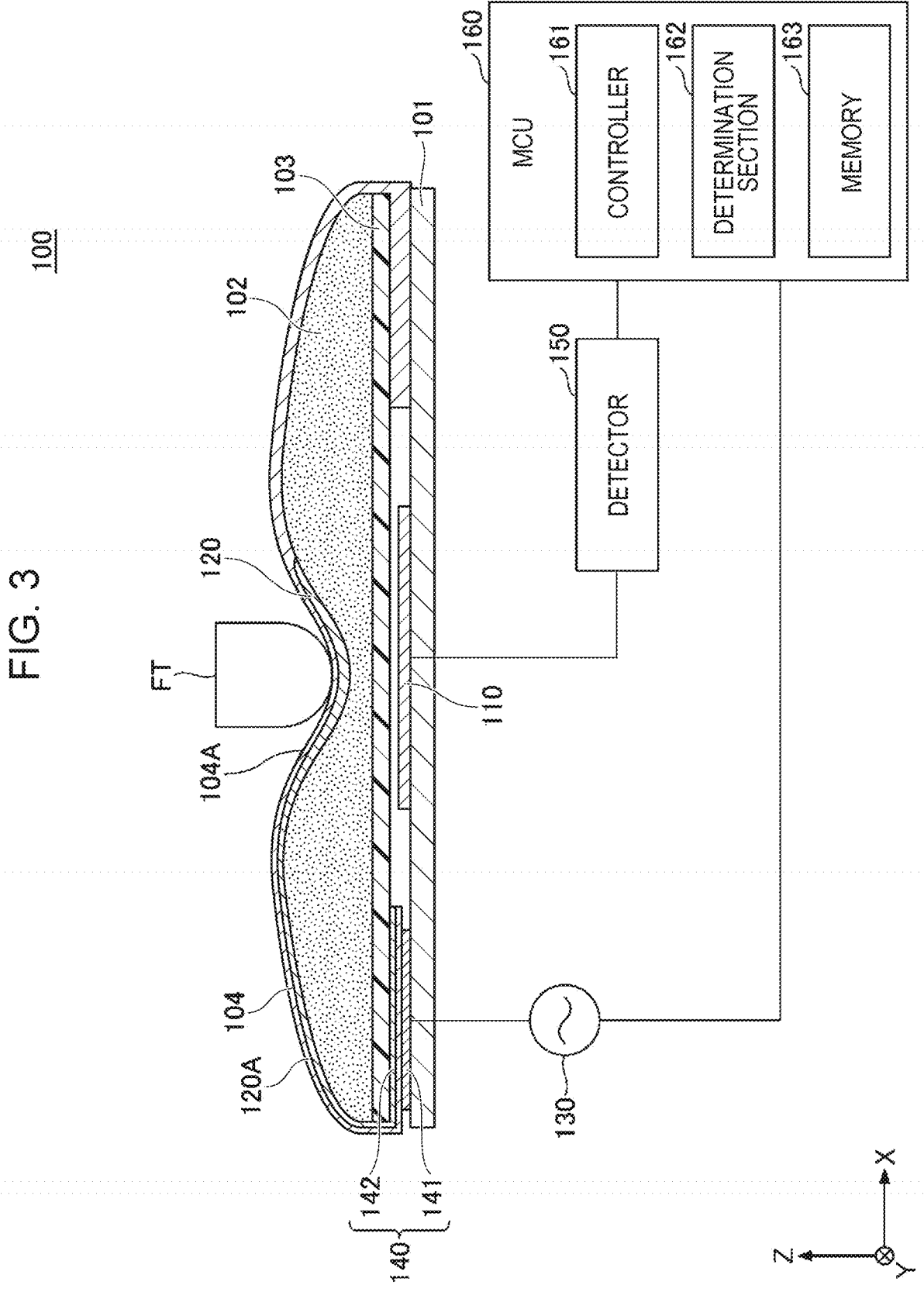
FIG. 3 is a diagram illustrating an example of a state in which a pressing operation is performed on the input device.

FIG. 3 is a diagram illustrating an example of a state in which a pressing operation is being performed on the input device 100. When a center portion of the skin 104 is pressed downward with the fingertip FT, the skin 104, the drive electrode 120, and the foam layer 102 bow as illustrated in FIG. 3, and therefore, a distance between the detection electrode 110 and drive electrode 120 is reduced. In this state, the determination section 162 determines that a pressing operation is being performed. Furthermore, the determination section 162 determines that a touching operation is being performed when the fingertip FT is in contact with the operation surface 104A but is not pressing the operation surface 104A downward. Moreover, the determination section 162 determines that an approaching operation is being performed when the fingertip FT is not in contact with the operation surface 104A but is approaching and the current value of the detection electrode 110 becomes somewhat small and meets a predetermined condition.

Figure 4:
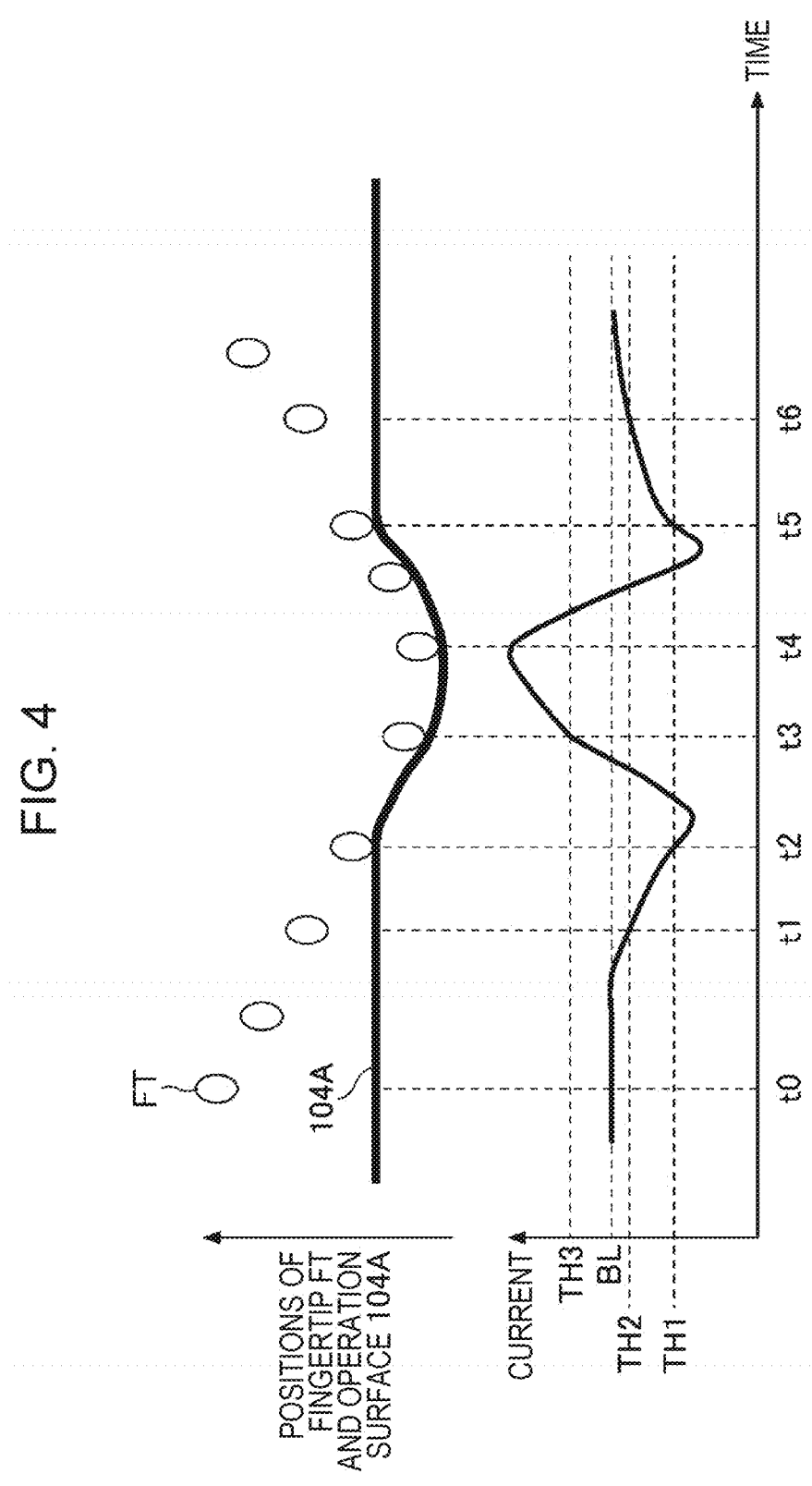
FIG. 4 is a diagram illustrating an example of a determination of an approaching operation, a touching operation, or a pressing operation.

Determination of Approaching Operation, Touching Operation, or Pressing Operation FIG. 4 is a diagram illustrating an example of a determination of an approaching operation, a touching operation, or a pressing operation. In FIG. 4, a horizontal axis is a time axis. An upper half of FIG. 4 illustrates an example of temporal changes in positions of the fingertip FT and the operation surface 104A in a height direction. A lower half of FIG. 4 illustrates an example of temporal changes in a current detected by the detector 150.

When no operation is performed on the input device 100, the capacitance C2 in FIG. 1A is approximately zero, but when a voltage is applied from the power supply 130 to the first electrode 141, some current flows to the detector 150 through the capacitor 140 (first and second electrodes 141 and 142), the extending portion 120A, and the capacitor composed of the detection electrode 110 and the drive electrode 120. The current flowing through the detector 150 in this state is referred to as a baseline current.

When an approaching operation is performed such that the fingertip FT approaches the input device 100 as illustrated in FIG. 1A, the capacitance C2 is generated between the fingertip FT and the drive electrode 120. When a voltage is applied to the first electrode 141 from the power supply 130 in this state, a current is supplied from the capacitor 140 (first and second electrodes 141 and 142) through the extending portion 120A to the capacitor composed of the fingertip FT and the drive electrode 120 and the capacitor composed of the detection electrode 110 and the drive electrode 120, and therefore, the current supplied to the detector 150 is reduced. This is also the case for a touching operation.

Furthermore, as illustrated in FIG. 3, the distance between the detection electrode 110 and the drive electrode 120 is reduced when the pressing operation is performed. Therefore, the capacitance C3 of the capacitor composed of the detection electrode 110 and the drive electrode 120 is considerably increased. When a voltage is applied to the first electrode 141 from the power supply 130 in this state, a current is supplied from the capacitor 140 through the extending portion 120A to the capacitor composed of the fingertip FT and the drive electrode 120 and the capacitor composed of the detection electrode 110 and the drive electrode 120. Since the current supplied to the capacitor composed of the detection electrode 110 and the drive electrode 120 is considerably increased, the current detected by the detector 150 is considerably increased to be greater than the baseline current.

The input device 100 operates in this manner, as illustrated in FIG. 4, as follows. At a time point to in FIG. 4, the fingertip FT is well away from the operation surface 104A and a current value corresponds to a value of a baseline BL. The baseline BL represents a current value of a baseline current. A first threshold value TH1 is used to detect a touching operation, and a second threshold value TH2 is used to detect an approaching operation. The second threshold value TH2 is greater than the first threshold value TH1.

As time passes, the fingertip FT approaches the operation surface 104A, and when the current value becomes equal to or less than the second threshold value TH2 at a time point t1, the determination section 162 determines that an approaching operation has been performed. That is, the determination section 162 determines that an approaching operation has been performed on the condition that the current value has fallen to the second threshold value TH2 or below without any change in the value for a past predetermined period of time. Furthermore, the determination section 162 determines that a touching operation has been performed when the current value falls to the first threshold value TH1 or below at a time point t2. In other words, when the current value falls to the first threshold value TH1 or below within a predetermined period of time after determining that an approaching operation has been performed, the determination section 162 determines that a touching operation has been performed.

Furthermore, after the time point t2, the fingertip FT starts a pressing operation. The current value is increased after taking a minimum value, and when the current value is increased to a value equal to or greater than a third threshold value TH3, which is greater than the baseline BL, at a time point t3, the determination section 162 determines that a pressing operation has been performed. That is, when the current value is increased to the third threshold value TH3 within a predetermined period of time after determining that a touching operation has been performed, the determination section 162 determines that a pressing operation has been performed.

Note that, when the current value is not increased to the third threshold value TH3 but only to the baseline BL within the predetermined period of time, it is determined that a pressing operation has not been performed, and furthermore, an approaching operation or a touching operations is no longer performed.

Thereafter, the fingertip FT further presses the operation surface 104A, and therefore, the current is increased until a time point t4. When the fingertip FT starts to return at the time point t4, the current is reduced, and when the current value is increased after taking a minimum value and becomes greater than the first threshold value TH1 at a time point t5, the determination section 162 determines that the fingertip FT has left the operation surface 104A. That is, when the current value falls below the first threshold value TH1 and is then increased within a predetermined period of time after determining that the pressing operation has been performed, the determination section 162 determines that the fingertip FT has left the operation surface 104A. When the fingertip FT is moved further away from the operation surface 104A and the current value is increased and becomes greater than the second threshold value TH2 at a time point t6, the determination section 162 determines that an approaching operation is no longer performed. That is, after determining that the fingertip FT has left the operation surface 104A, when the current value becomes greater than the second threshold value TH2 within a predetermined period of time, the determination section 162 determines that an approaching operation is no longer performed.

Thus, the input device 100 of this embodiment includes the capacitor 140 connected in series between the drive electrode 120 and the power supply 130, so that an approaching operation, a touching operation, or a pressing operation of the fingertip FT can be detected.

Effect

The input device 100 includes the detection electrode 110, the drive electrode 120 facing the detection electrode 110, the power supply 130 that applies an AC drive voltage to the drive electrode 120, the detector 150 that detects an output of the detection electrode 110, and the capacitor 140 disposed in series between the drive electrode 120 and the power supply 130. Therefore, since the capacitance C1 of the capacitor 140 is provided between the drive electrode 120 and the power supply 130, when the fingertip FT approaches the drive electrode 120, the current value detected by the detector 150 is changed, and an approaching operation, a touching operation, or a pressing operation can be detected.

Thus, the input device 100 that can detect an operation of the operation body with a simple configuration can be provided.

The input device 100 further includes the foam layer 102 that can be deformed by a pressing operation performed by the operation body on the operation surface 104A. The drive electrode 120 is disposed on a side near the operation surface 104A relative to the foam layer 102, and the detection electrode 110 is disposed on a side opposite to the operation surface 104A relative to the foam layer 102. Accordingly, the input device 100 is provided that can detect an operation of the operation body by a change in the capacitance C3 between the drive electrode 120 and the detection electrode 110 caused by deformation of the foam layer 102 as a result of a pressing operation.

The input device 100 further includes the substrate 101 disposed on an opposite side of the operation surface 104A relative to the foam layer 102. The detection electrode 110 is disposed on the substrate 101, and the capacitor 140 includes the first electrode 141 disposed on the substrate 101 and the second electrode 142 facing the first electrode 141. The drive electrode 120 has the extending portion 120A that extends toward the second electrode 142 and is connected to the second electrode 142. Therefore, the extending portion 120A can easily connect the second electrode 142 of the capacitor 140 to the drive electrode 120, and by applying an AC voltage from the power supply 130 to the first electrode 141 disposed on the substrate 101, a drive voltage can be applied to the drive electrode 120 through the capacitor 140 and the extending portion 120A. Furthermore, since the foam layer 102 is disposed on the substrate 101 having the detection electrode 110, positioning of the drive electrode 120 with respect to the detection electrode 110 can be easily performed. Since the bottom surface of the foam layer 102 is not deformed, the capacitance C1 of the capacitor 140 can be held constant and good detection accuracy can be attained. The inclusion of the substrate 101 thus configured simplifies assembly of the entire input device 100.

The input device 100 further includes the skin 104 covering the foam layer 102. The drive electrode 120 and the extending portion 120A are formed on the skin 104, and the outer surface of the foam layer 102 is covered with the skin 104 serving as the decorative layer so that a good design is provided. Furthermore, since the drive electrode 120 and the extending portion 120A are disposed on the skin 104, attachment and positioning of the drive electrode 120 and the extending portion 120A are facilitated.

Since the operation surface 104A is the portion of the outer surface of the skin 104 that overlaps the drive electrode 120, an approaching operation, a touching operation, and a pressing operation on the operation surface 104A can be reliably detected.

In addition, since the input device 100 further includes the determination section 162 that determines that a touching operation has been performed by the operation body when an output of the detector 150 falls to the first threshold value TH1 or below, the input device 100 capable of detecting a touching operation by the operation body with a simple configuration can be provided.

Since the determination section 162 determines that an approaching operation of the operation body has been performed when an output of the detector 150 becomes the second threshold value TH2 or below, which is greater than the first threshold value TH1, the input device 100 capable of detecting an approaching operation of the operation body with a simple configuration can be provided.

In addition, the determination section 162 determines that a pressing operation by the operation body has been performed when an output of the detector 150 changes from a value smaller than the first threshold value TH1 to a value equal to or greater than the third threshold value TH3 that is greater than the baseline value of the output of the detector 150 after a touching operation is determined, and therefore, the input device 100 capable of detecting a pressing operation of the operation body with a simple configuration can be provided. When a pressing operation is performed, the capacitance C3 of the capacitor composed of the detection electrode 110 and the drive electrode 120 is considerably increased and a current supplied to the capacitor composed of the detection electrode 110 and the drive electrode 120 is considerably increased, so that the current reduced when the touching operation is detected is changed to be increased. By detecting this change, it can be reliably determined that a pressing operation has been performed.

First Modification

Figure 5:
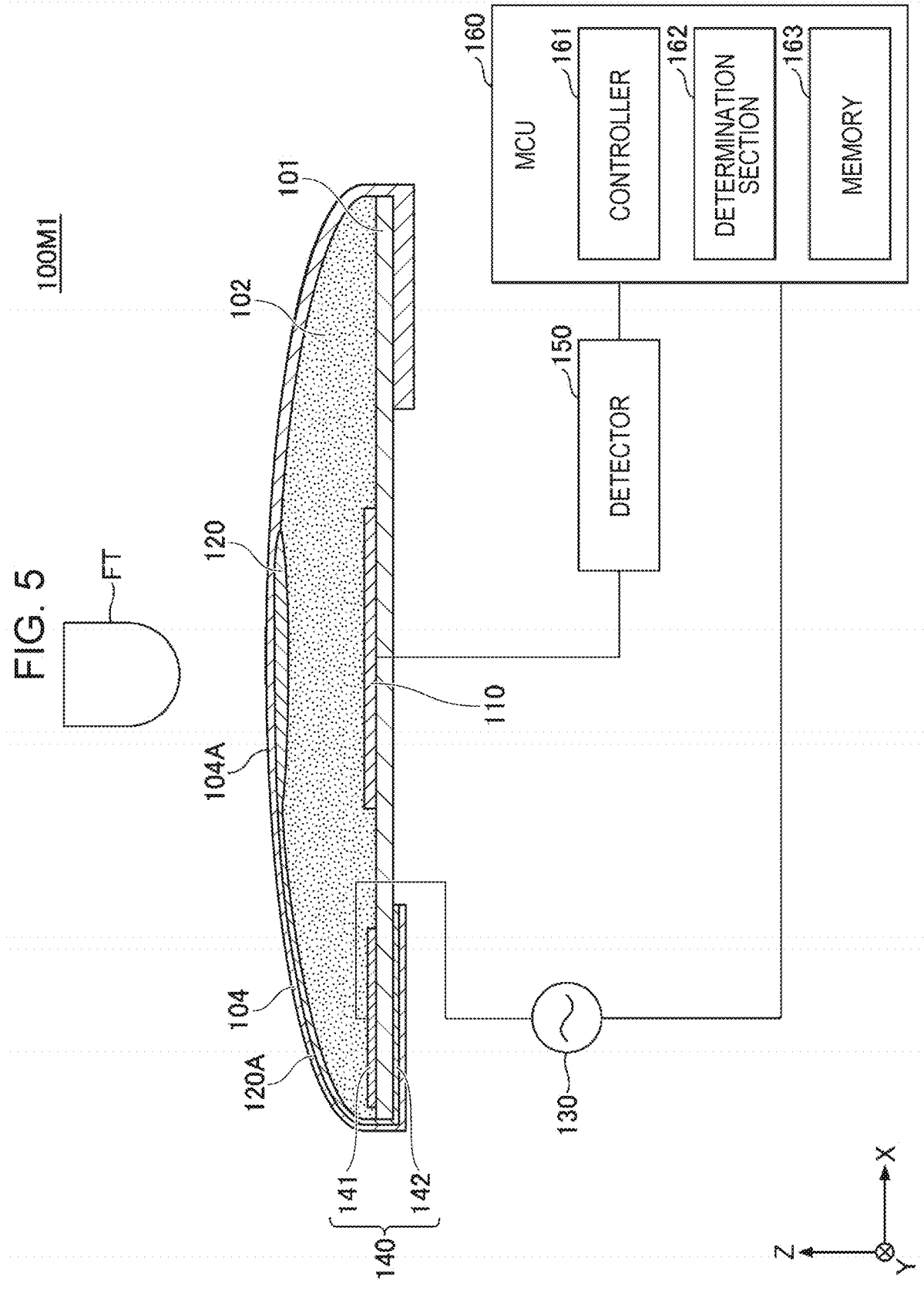
FIG. 5 is a diagram illustrating an example of a cross-sectional configuration of an input device according to a first modification of the embodiment.

FIG. 5 is a diagram illustrating an example of a cross-sectional configuration of an input device 100M1 according to a first modification of the embodiment. A cross section illustrated in FIG. 5 corresponds to the cross section of the input device 100 illustrated in FIG. 1A. In the input device 100M1 of the first modification, components similar to those of the input device 100 illustrated in FIG. 1A are denoted by the same symbols, and their descriptions are omitted.

The input device 100M1 includes a substrate 101, a foam layer 102, a skin 104, a detection electrode 110, a drive electrode 120, a power supply 130, a capacitor 140, a detector 150, and an MCU 160. The input device 100M1 is different from the input device 100 illustrated in FIG. 1A in that the input device 100M1 does not include the support plate 103 (see FIG. 1A), the substrate 101 is disposed in the position of the support plate 103 of FIG. 1A, and the second electrode 142 is disposed on a back surface of the substrate 101.

Thus, since the second electrode 142 is disposed on the back surface of the substrate 101, the number of components may be reduced, and the input device 100M1 capable of detecting an operation of an operation body with a simpler configuration can be provided.

Second Modification

Figure 6:
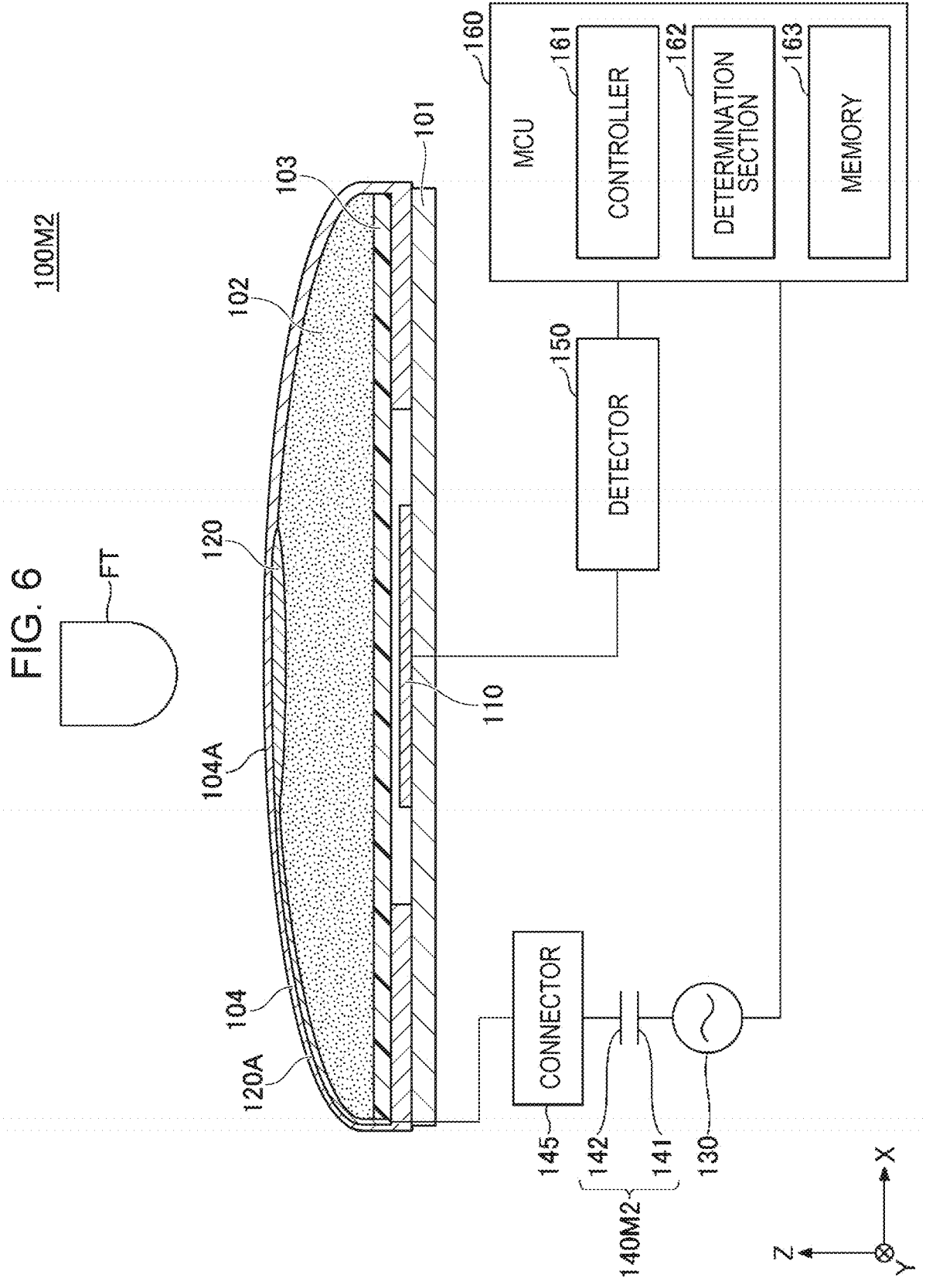
FIG. 6 is a diagram illustrating an example of a cross-sectional configuration of an input device according to a second modification of the embodiment.

FIG. 6 is a diagram illustrating an example of a cross-sectional configuration of an input device 100M2 according to a second modification of the embodiment. A cross section illustrated in FIG. 6 corresponds to the cross section of the input device 100 illustrated in FIG. 1A. In the input device 100M2 of the second modification, components similar to those of the input device 100 illustrated in FIG. 1A are denoted by the same symbols, and their descriptions are omitted.

The input device 100M2 includes a substrate 101, a foam layer 102, a support plate 103, a skin 104, a detection electrode 110, a drive electrode 120, a power supply 130, a capacitor 140M2, a detector 150, and an MCU 160. The input device 100M2 is different from the input device 100 illustrated in FIG. 1A in that the input device 100M2 includes the capacitor 140M2 instead of the capacitor 140 illustrated in FIG. 1A. In the input device 100M2, unlike the input device 100 illustrated in FIG. 1A, the first electrode 141 is not disposed on the substrate 101 and the second electrode 142 is not disposed on the skin 104.

The capacitor 140M2 has a first electrode 141 and a second electrode 142 and is positioned away from the substrate 101, the foam layer 102, the support plate 103, and the skin 104. The first electrode 141 is connected to the power supply 130, and the second electrode 142 is connected to an extending portion 120A via a connector 145. A chip capacitor or the like may be used as the capacitor 140M2.

Since the capacitor 140M2 is thus disposed at a distance from the substrate 101, the foam layer 102, the support plate 103, and the skin 104, the input device 100M2 capable of detecting an operation of an operation body with a simple configuration can be provided. Furthermore, since an external capacitor, such as a chip capacitor, can be used as the capacitor 140M2, the high accuracy of a capacitance can be attained and the accuracy of a determination can be improved.

Note that, although the capacitor 140M2 is located away from the substrate 101 in the second modification, the capacitor 140M2 may be constituted by a chip capacitor and mounted on the substrate 101.

Although the exemplary embodiment of the input device according to the present disclosure has been described hereinabove, the present disclosure is not limited to the embodiment disclosed in detail, and various modifications and changes may be made without departing from claims.

This international application claims priority based on Japanese Patent Application NO. 2022-180505 filed on Nov. 10, 2022, and the entire contents of which are hereby incorporated by reference into this international application.

What is claimed is:
1. An input device comprising:
a detection electrode;
a drive electrode facing the detection electrode;
a power supply configured to apply an alternating current drive voltage to the drive electrode;
a detector configured to detect an output of the detection electrode;
a capacitor disposed in series between the drive electrode and the power supply so that the alternating current drive voltage is applicable to the drive electrode; and an elastic member that is deformable by a pressing operation performed by an operation body on an operation surface, wherein the drive electrode is disposed on a portion closer to the operation surface relative to the elastic member, and the detection electrode is disposed on a portion opposite to the operation surface relative to the elastic member.

2. The input device according to claim 1, wherein the capacitor includes a first electrode and a second electrode facing the first electrode, the first electrode is connected to the power supply, and the second electrode is connected to the drive electrode.

3. The input device according to claim 1, further comprising:

a substrate that is disposed on a portion opposite to the operation surface relative to the elastic member, wherein the capacitor includes a first electrode and a second electrode facing the first electrode, the detection electrode and the first electrode are disposed on the substrate, and the drive electrode has an extending portion extending toward and connected to the second electrode.

4. The input device according to claim 1, further comprising:

a skin that covers the elastic member, wherein the drive electrode has an extending portion, and the drive electrode and the extending portion are disposed on the skin.

5. The input device according to claim 4, wherein the operation surface is a portion of an outer surface of the skin that overlaps the drive electrode.

6. The input device according to claim 1, further comprising:

a determination section configured to determine, when an output of the detector falls to a first threshold value or below, that a touching operation has been performed by an operation body.

7. The input device according to claim 6, wherein the determination section is further configured to determine, when the output of the detector falls to a second threshold value or below that is greater than the first threshold value, that an approaching operation has been performed by the operation body.

8. The input device according to claim 6, wherein the determination section is further configured to determine that a pressing operation has been performed by the operation body when the output of the detector changes from a value smaller than the first threshold value to a value equal to or greater than a third threshold value that is greater than a baseline value of the output of the detector after determining that the touching operation has been performed.

9. The input device according to claim 1, further comprising:

an elastic member that is deformable by a pressing operation performed by an operation body on an operation surface; and a substrate that is disposed on a portion opposite to the operation surface relative to the elastic member, wherein the detection electrode is disposed on the substrate, the capacitor includes a first electrode disposed on the substrate and a second electrode facing the first electrode, and the drive electrode has an extending portion extending toward and connected to the second electrode.

10. An input device comprising:

a detection electrode;

a drive electrode facing the detection electrode;

a power supply configured to apply an alternating current drive voltage to the drive electrode;

a detector configured to detect an output of the detection electrode;

a capacitor disposed in series between the drive electrode and the power supply so that the alternating current drive voltage is applicable to the drive electrode;

an elastic member that is deformable by a pressing operation performed by an operation body on an operation surface; and a substrate that is disposed on a portion opposite to the operation surface relative to the elastic member, wherein the detection electrode is disposed on the substrate, the capacitor includes a first electrode disposed on the substrate and a second electrode facing the first electrode, and the drive electrode has an extending portion extending toward and connected to the second electrode.

11. The input device according to claim 10, further comprising:

a skin that covers the elastic member, wherein the drive electrode and the extending portion are disposed on the skin.

12. The input device according to claim 11, wherein the operation surface is a portion of an outer surface of the skin that overlaps the drive electrode.

13. The input device according to claim 10, further comprising:

a determination section configured to determine, when an output of the detector falls to a first threshold value or below, that a touching operation has been performed by an operation body.

14. The input device according to claim 13, wherein the determination section is further configured to determine, when the output of the detector falls to a second threshold value or below that is greater than the first threshold value, that an approaching operation has been performed by the operation body.

15. The input device according to claim 13, wherein the determination section is further configured to determine that a pressing operation has been performed by the operation body when the output of the detector changes from a value smaller than the first threshold value to a value equal to or greater than a third threshold value that is greater than a baseline value of the output of the detector after determining that the touching operation has been performed.

* * * * *